Jan. 19, 1965   W. J. KOZIBA   3,165,857
FISH LURE
Filed June 22, 1961

INVENTOR.
Walter Koziba
BY Friedman & Goodman
Attorneys 3,165,857
FISH LURE
Walter J. Koziba, 45 Pease St., Thompsonville, Conn., assignor of one-half to William F. Cioffi, Brooklyn, N.Y.
Filed June 22, 1961, Ser. No. 118,928
2 Claims. (Cl. 43—42.15)

This invention relates in general to fish lures and, more particularly, to a fish lure which is a combination lure, sinker and fish hook.

An object of this invention is to provide a lure which may be used for trolling at lower depths below the surface without the necessity of using heavy sinkers in front of the lure to hold it down or prevent it from skipping over the surface of the water.

Another object of this invention is to provide a lure which is lifelike in its motion and attractive to game fish.

A further object of this invention is to provide a less costly and more easily fabricated combination lure, sinker and fish hook.

Still another object of this invention is to provide a stronger articulated lure and fish hook which will not be ripped apart when struck by a game fish.

Yet another object of this invention is to provide a lure, fish hook and sinker which is easier to use and less likely to become fouled.

A still further object of this invention is to provide a stronger lure which is mainly articulated in one plane and which has its degree of articulation controlled.

Other objects, advantages and features of invention reside in the particular construction, arrangement and combination of parts involved in the embodiment of the invention and its practice as will be understood from the following description and accompanying drawing wherein.

Figure 1:
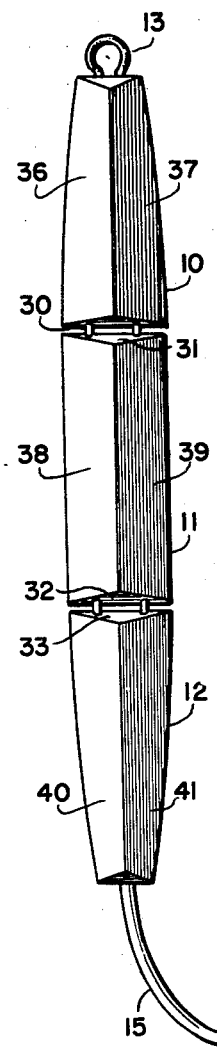
FIGURE 1 is a side view of the combination lure, fish hook and sinker.

Referring to the drawing in detail, the lure of this invention consists of a head member 10, a central body member 11 and a tail member 12. These members are preferably cast from lead which may be alloyed with suitable materials to make it harder and structurally stronger. An attachment eye 13 has an external loop projecting from the front of the head member 10. Two inwardly disposed portions 14 of the attachment eye 13 are suitably bent, curled, or otherwise distorted so that, when the inner portions 14 have the head member 10 cast about them, the inner portions 14 will securely anchor the attachment eye 13.

A standard fish hook 15 with a barb 16 has the tail member 12 cast about its shank. Since the loop or hook eye 17 has the material of the tail portion 12 cast about it, the loop 17 secures the hook 15 securely within the tail portion 12.

Figure 4:
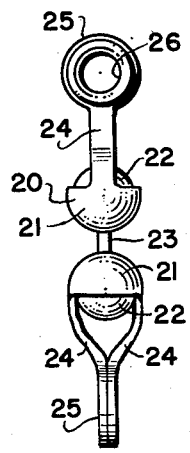
FIGURE 4 is a side view of a swivel used in the construction of this invention with one element of the swivel rotated through 90° in relation to the other element of the swivel.

The head member 10 is joined to the body member 11 by means of a pair of swivels 20. The tail member 12 is also joined to the body member 11 by a pair of swivels 20. Referring now to FIGURE 4, each swivel 20 consists of a lower hollow hemispherical portion 21 which contains a sphere 22. The spheres 22 are joined by a strong wire 23 which extends through apertures (not shown) formed in the bottoms of the hollow hemispheres 21. Two arms 24 extend upward from each side of each hemispherical portion 21. These arms 24 are brought together above each sphere 22 and they terminate in the eyelet portion 25 containing the aperture 26.

Figure 2:
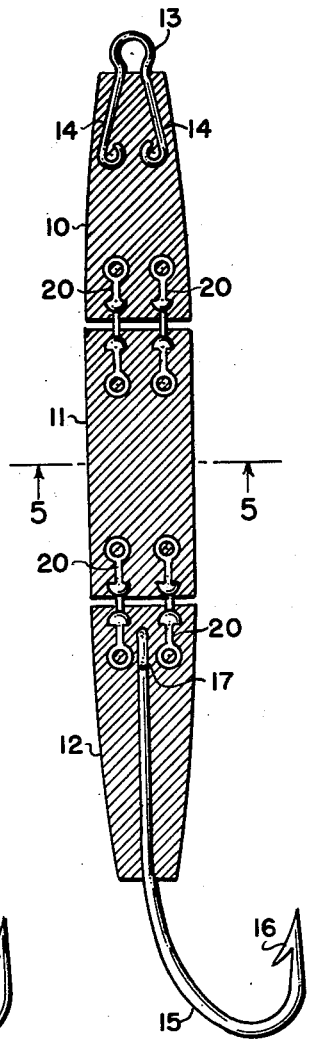
FIGURE 2 is a longitudinal section through the combination lure, fish hook and sinker.

Referring again to FIGURE 2, it is to be noted that the swivels 20 are disposed one above the other in a vertical plane. As the lead of the head member 10, the body portion 11 and the tail member 12 is cast about the eyelets 20, the lead flows between the arms 24, through the apertures 26, and about the hollow hemispherical portions 21 and the eyelet portions 25 of each swivel. After the lead hardens, the swivels are thus securely anchored within the sections of the lure. The lead also flows about the spheres 22, however, probably due to the contraction of the lead on cooling, the spheres 22 do not become bound and they enable the wires 23 to pivot.

Figure 3:
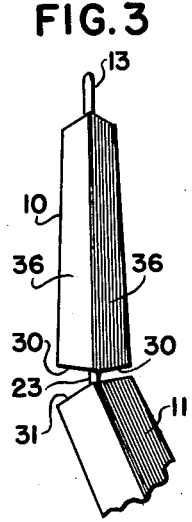
FIGURE 3 is a top view of an upper fragment of the combination lure, fish hook and sinker showing the articulation between two sections.

Since the swivels 20 are disposed in a vertical plane, the main articulation of the lure, as shown in FIGURE 3, is in a horizontal plane. Because there is a general looseness of the swivels 20, a slight articulation may take place in the vertical plane. Therefore, the articulation of this lure approximates the motion of a living bait fish.

Referring further to FIGURE 3, it may be seen that the articulation between the head member 10 and the body 11 is determined by the degree of bevel of the flat abutting end surfaces 30 and 31 because, when the surfaces 30 and 31 contact each other, they limit articulation between adjoining portions of the lure. In a like manner as shown in FIGURE 1, the degree of articulation between the body member 11 and the tail portion 12 is determined by the angle of the abutting end surfaces 32 and 33. Each side of the head member 10 is formed by the two relatively flat surfaces 36 and 37. In the same manner each side of the body 11 is formed by the relatively flat surfaces 38 and 39 while the two surfaces 40 and 41 form each side of the tail member 12.

Figure 5:
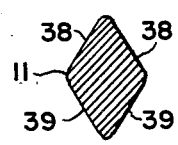
FIGURE 5 is a section taken on line 5—5 of FIGURE 2.

As shown in FIGURE 5, a cross-section through the lure is diamond-shaped to approximate the appearance of a fish's body. The surfaces 36, 37, 38, 39, 40 and 41 may be buffed to a high lustre or they may be buffed and then chrome plated. These gleaming surfaces catch and reflect the sun's rays beneath the water to attract fish.

When a fish strikes at this lure, its teeth will tend to clamp about the body portion 11 or the tail portion 12. These structurally strong and rigid members cannot be damaged by the fish's teeth so that the fish will be caught by the hook 15.

While I have shown and described my invention in the best form known to me, it will nevertheles be understood that this is purely exemplary and that modification in the construction, arrangement and combination of parts and substitution of materials may be made without departing from the spirit of the invention except as it may be more limited in the appended claims wherein I claim:

1. A fish lure comprising, in combination, a head portion, a body portion, a tail portion, said portions each having sides formed by two highly reflective surfaces, said portions having abutting end portions and being formed of a heavy metal so that the lure will sink in water, an attachment eye having a forward part extending from the front of said head portion and having a rearward part located within said head portion, a hook having a shank, said hook extending from said tail portion with the shank of said hook being located within said tail portion, and swivels having two elements and a wire joining said elements, said swivels being located in pairs in abutting end portions of said lure with the wires of said swivels extending between adjacent abutting end portions of said lure, said swivels being disposed in a vertical plane.

2. A fish lure comprising, in combination, a head portion, a body portion, a tail portion, said portions being diamond shaped in cross-section and each having sides formed by two highly reflective surfaces, said portions having abutting end portions and being formed of a heavy metal, so that the lure will sink in water, an attachment eye having a forward part extending from the front of said head portion and having a rearward part located within said head portion, a hook having a shank, said hook extending from said tail portion with the shank of said hook being located within said tail portion, and swivels having two elements and a wire joining said elements, said swivels being located in pairs in abutting end portions of said lure with the wires of said swivels extending between abutting end portions of said lure, said swivels being disposed in a vertical plane, said abutting end portions terminating in end surfaces with the articulation of adjacent portions of said lure being limited by the contact of adjacent end surfaces.

References Cited in the file of this patent

UNITED STATES PATENTS

| | | |
|---|---|---|
| 1,455,624 | Koch | May 15, 1923 |
| 1,477,756 | Heddon et al. | Dec. 18, 1923 |
| 1,805,416 | Raymond | May 12, 1931 |
| 1,865,359 | Eger | June 28, 1932 |
| 2,685,145 | Dean | Aug. 3, 1954 |
| 2,778,144 | Jones et al. | Jan. 22, 1957 |

FOREIGN PATENTS

| | | |
|---|---|---|
| 672,090 | France | Sept. 14, 1929 |